United States Patent
Steele

(10) Patent No.: US 6,170,564 B1
(45) Date of Patent: Jan. 9, 2001

(54) ROOM TEMPERATURE CURE ANTIMICROBIAL COATING THAT DEMONSTRATES A BALANCE OF PROPERTIES INCLUDES LOW DISSOLUTION AND GOOD COHESION AND ADHESION

(75) Inventor: John W. Steele, New Hartford, CT (US)

(73) Assignee: Unted Technologies Corporation, Hartford, CT (US)

( * ) Notice: Under 35 U.S.C. 154(b), the term of this patent shall be extended for 0 days.

(21) Appl. No.: 09/223,208

(22) Filed: Dec. 30, 1998

(51) Int. Cl.$^7$ .............. F28F 13/18; C09D 5/14; C09D 5/00; A01N 25/24
(52) U.S. Cl. .......... 165/133; 106/15.05; 165/134.1; 165/DIG. 512; 165/DIG. 514; 424/407; 424/411
(58) Field of Search .............. 424/405, 407, 424/411; 427/116, 123, 125, 236, 397.7, 372.2, 374.1; 106/15.05, 286.1, 286.8, 287.18; 165/133, 134.1, DIG. 512, DIG. 514; 428/450, 469

(56) References Cited

U.S. PATENT DOCUMENTS

| | | | |
|---|---|---|---|
| 5,264,250 | 11/1993 | Steel et al. | 427/380 |
| 5,305,827 | 4/1994 | Steel et al. | 165/133 |
| 5,366,004 | 11/1994 | Garner et al. | . |
| 5,562,949 | * 10/1996 | Steele et al. | . |
| 5,806,585 | * 9/1998 | Yoshida et al. | 165/171 |

FOREIGN PATENT DOCUMENTS

| | | |
|---|---|---|
| 56-161477 | 12/1981 | (JP) . |
| WO 98 41585 | 9/1998 | (WO) . |

* cited by examiner

Primary Examiner—Diana Dudash
Assistant Examiner—Shahnam Sharareh
(74) Attorney, Agent, or Firm—Mary R. Bonzagni, Esq.; Holland & Bonzagni, P.C.

(57) ABSTRACT

Room temperature cure, antimicrobial coatings that demonstrate a balance of properties including low dissolution and good cohesion and adhesion are provided. Such coatings generally exhibit a greater zone of microbial inhibition, greater cohesion and a greater degree of adhesion to target surfaces when compared to high temperature cure, antimicrobial, hydrophilic coatings.

12 Claims, No Drawings

ROOM TEMPERATURE CURE ANTIMICROBIAL COATING THAT DEMONSTRATES A BALANCE OF PROPERTIES INCLUDES LOW DISSOLUTION AND GOOD COHESION AND ADHESION

FIELD OF THE INVENTION

The present invention relates in general to antimicrobial coatings and, more particularly, to room temperature cure, antimicrobial coatings that demonstrate a balance of properties including low dissolution and good cohesion and adhesion.

BACKGROUND OF THE INVENTION

Antimicrobial coatings can be used in a variety of space life support and commercial applications where control of microbial growth is of particular concern.

High temperature cure, hydrophilic (optionally antimicrobial) coatings that rely upon an inorganic compound, such as silica, to provide hydrophilic characteristics to the coating, are known.

U.S. Pat. No. 5,562,949 to Steele et al. discloses an optionally antimicrobial, hydrophilic, high temperature cure coating composition that contains from about 10% to about 20 wt. % of an inorganic compound (e.g., silica, calcium silicate or mixtures thereof). This reference teaches that complete curing of the coating occurs at temperatures up to and including 260° C.

U.S. Pat. No. 5,305,827 to Steele et al. discloses an antimicrobial, hydrophilic coating that comprises an adhesive agent (e.g., potassium silicate); an insolubilizer (e.g., zinc oxide); an inorganic compound (e.g., silica, calcium silicate, and mixtures thereof); and from about 0.1 wt. % to about 1.0 wt. % of silver oxide. The coating of U.S. Pat. No. '827 is cured at a temperature of 5000° F. (260° C.) either sequentially or very slowly over a period of from 1 to 6 hours (see Col. 5, lines 62–65 of U.S. Pat. No. '827).

U.S. Pat. No. 5,264,250 to Steele et al. discloses a method for coating heat transfer surfaces of a condensing heat exchanger with the above-referenced antimicrobial, hydrophilic coating. Again, this reference teaches a cure temperature of 500° F. (260° C.).

As will be readily evident to those skilled in the art, such high temperature cure coatings are not applicable to, nor can such coatings be applied in close proximity to, heat sensitive materials. Further, the need to cure coatings at high temperatures complicates the coating process by increasing the processing time and the complexity of the equipment associated therewith.

It is therefore an object of the present invention to provide a room temperature cure, antimicrobial coating.

It is a more particular object to provide a room temperature cure, antimicrobial coating that demonstrates a balance of properties including low dissolution and good cohesion and adhesion.

It is yet a more particular object to provide a room temperature cure, antimicrobial coating that demonstrates a greater zone of microbial inhibition, greater cohesion and a greater degree of adhesion to target surfaces when compared to high temperature cure, antimicrobial, hydrophilic coatings.

It is a further object to provide an air handling or water processing system or subsystem having chronically moist or wet surfaces that have been coated with such a room temperature cure, antimicrobial coating.

SUMMARY OF THE INVENTION

The present invention therefore provides a room temperature cure, antimicrobial coating. The coating, in the form of a slurry, comprises:
  a. from about 1.0% to about 3.6% by weight of an antimicrobial agent;
  b. from about 22.6% to about 33.8% by weight of an adhesive agent;
  c. from about 12.8% to about 18.7% by weight of an insolubilizer for insolubilizing the adhesive agent; and
  d. from about 47.4% to about 60.3% by weight of water or a water-based solvent,
    where the sum of the components is 100% by weight, based upon the total weight of the slurry.

The present invention also provides an air handling or water processing system or subsystem having chronically moist or wet surfaces that have been coated with the room temperature cure, antimicrobial coating described hereinabove.

The foregoing and other features and advantages of the present invention will become more apparent from the following description.

DETAILED DESCRIPTION OF THE INVENTION

Although the present inventive room temperature cure, antimicrobial coating will be described herein in reference to air handling or water processing systems or subsystems (e.g., air conditioner cooling coils) it is not so limited. This coating can be utilized on any surface where control of microbial growth is of particular concern. In particular, any chronically moist or wet substrate, the functionality of which can be disrupted by biogrowth, represents a potential application area for the present inventive coating. In addition, any chronically moist or wet system or subsystem that can shed microbes into an effluent air or water stream and potentially adversely effect occupant health represents another potential application area for this coating.

The antimicrobial agent of the present invention provides biocidal characteristics to the coating. In order to prevent microbial proliferation, the antimicrobial agent is preferably a substance which slowly dissolves into a condensate and inhibits microbial growth. For example, if silver oxide is utilized as the antimicrobial agent, it slowly dissolves into the condensate in the form of silver ions. The silver ions diffuse through the cell walls of the microbe, and complex with the cellular DNA therein. This complex formation interrupts the normal role of DNA and thus prevents reproduction of the microbe. Conventional biocides which have an equilibrium dissolution rate similar to that of the adhesive agent and the insolubilizer described below can be employed. If the antimicrobial agent dissolves into the condensate at a faster rate than the adhesive agent and/or insolubilizer, the effectiveness of the antimicrobial agent can be reduced.

Possible antimicrobial agents include salts such as arsenic salts, iodine salts, iron salts, mercury salts, silver salts, tin salts, and mixtures therein)f, with mercury salts and silver salts preferred. Silver salts are especially preferred. A silver salt which has proven particularly useful as an antimicrobial agent having an appropriate equilibrium dissolution rate is silver oxide, which can be purchased from Mallinckrodt Co., Paris, Ky., in a purified powder form.

The preferred concentration of the antimicrobial agent, based upon the total weight of the slurry of the present invention, is from about 1.0% to about 3.6% by weight, with the more preferred concentration being from about 3.0% to about 3.6% by weight.

It is noted herein that an absence of any detrimental effect on the desirable properties of the coating (e.g., adhesion, cohesion) when using such increased quantities of an antimicrobial agent is both unexpected and surprising. Prior studies have indicated that an increase in the concentration of silver oxide to the levels indicated above will result in a corresponding drop off in the adhesion and cohesion properties of the resulting coating.

The antimicrobial agent preferably has an average particle size of from about 6 to about 14 microns, with about 8 to about 10 microns especially preferred. Particle sizes in this range contribute to desirable dissolution properties, increase the slurry life, components do not separate out as quickly, and the slurry is easier to mix.

The adhesive agent and insolubilizer used in the present inventive coating collectively provide structural integrity to the coating by binding it together and by preventing flaking and cracking. The adhesive agent and insolubilizer also serve to effect good adherence to and uniformity of coverage of the coating on target surfaces.

The increased cohesion/adhesion demonstrated by the present inventive coating, that is cured at room temperature, is surprising and unexpected. As is well known to those skilled in the art, curing is a process by which a network of cross-links is introduced into a material. As curing temperatures are increased, the expectation is that the level of cross-linking, not only within the material but also between the material and the surface it coats, will increase as well, thereby producing a stronger, tougher and more adherent material. As curing temperatures are decreased, the expectation is that the level of cross-linking will decrease thereby resulting in a weaker, less adherent material.

Typically, the adhesive agent is potassium silicate, lead borosilicate glass frit, or mixtures thereof. One such adhesive agent is Kasils® #1, produced by Philadelphia Quartz Co., Philadelphia, Pa. Kasil® #1 contains 20.8% by weight silica, 8.3% by weight potassium oxide, balance water (i.e., 3.92 $SiO_2:K_2O$ molar ratio). The preferred concentration of adhesive agent, based upon the total weight of the slurry, in the present invention, is from about 22.6% to about 33.8% by weight and the more preferred concentration is from about 22.6% to about 32.6% by weight.

During preparation of the present inventive coating, the adhesive agent is generally in the form of a water soluble material. As a result, coating preparation requires conversion of the adhesive agent from a water soluble material to a water insoluble material with an insolubilizer which does not adversely effect the coating. As with the antimicrobial agent, the insolubilizer preferably has an average particle size of from about 6 to about 14 microns, with about 8 to about 10 microns especially preferred due to improved slurry life and simplified slurry preparation.

Possible insolubilizers include silicofluorides ($SiF_6$) of sodium, potassium, barium, manganese and mixtures thereof, and inorganic oxides such as zinc oxide, among others. One such inorganic oxide is Kadox® 15, 99% pure zinc oxide, produced by New Jersey Zinc Co., Ogdensborg, N.J. Particularly with the silicofluoride insolubilizers, sodium hydroxide can be used as a colloidal dispersant. The preferred concentration of insolubilizer, based upon the total weight of the slurry, of the present invention is from about 12.8% to about 18.7% by weight and the more preferred concentration is from about 12.8% to about 14.8% by weight.

Typically, during preparation of the present inventive coating, the antimicrobial agent is combined with the adhesive agent and insolubilizer in a solvent that does not adversely effect the final coating, to form a slurry. This solvent is typically water or a water-based solvent. The solvent concentration generally ranges from about 47.4% to about 60.3% by weight with between about 50.3% to about 60.3% by weight preferred, based upon the total weight of the slurry.

In accordance with the above, the preferred room temperature cure, antimicrobial coating, in slurry form, of the present invention comprises:

a. from about 1.0% to about 3.6% by weight, of an antimicrobial agent;

b. from about 22.6% to about 33.8% by weight, preferably from about 22.6% to about 32.6% by weight, of an adhesive agent;

c. from about 12.8% to about 18.7% by weight, preferably from about 12.8% to about 14.8% by weight, of an insolubilizer for insolubilizing the adhesive agent; and d. from about 47.4% to about 60.3% by weight, preferably from about 50.3% to about 60.3% by weight, of water or a water-based solvent, where the sum of the components is 100% by weight, based upon the total eight of the slurry.

In the most preferred embodiment, the room temperature cure, antimicrobial coating, in slurry form, of the present invention comprises:

a. from about 3.0% to about 3.6% by weight of an antimicrobial agent;

b. from about 22.6% to about 32.6% by weight of an adhesive agent;

c. from about 12.8% to about 14.8% by weight of an insolubilizer for insolubilizing the adhesive agent; and d. from about 50.3% to about 60.3% by weight of water or a water-based solvent, where the sum of the components is 100% by weight, based upon the total weight of the slurry.

The room temperature cure, antimicrobial coating of the present invention may contain other components including stabilizers, corrosion inhibitors, antifungal agents, etc. provided any such component does not serve to adversely effect the desirable properties of the coating. For example, silicone stabilizers that would allow a $SiO_2:K_2O$ molar ratio shift from 3.92 to 5.0 may be employed.

In preparing the present inventive coating, the slurry components are mixed until essentially homogenous and then utilized before the components aggregate or agglomerate and settle creating component rich and component d,void areas in the coating. The time period during which the present inventive coating, in the form of a slurry, may be applied is approximately 30 minutes. Thereafter, reagitation would be required.

Application of the coating, in the form of a slurry, to any surface can be accomplished in various manners, all of which are conventional. These conventional processes include dipping, spraying, and painting the surfaces with the slurry, flowing the slurry through any inner surfaces and allowing it to remain a sufficient period of time to coat the inner surfaces, and other common coating techniques.

For coatings on inner surfaces formed by the flow through method, the coating density preferably ranges from about 0.006 to 0.009 grams/square centimeter ($g/cm^2$) while the coating thickness preferably ranges from about 25 to 102 microns.

Once the coating has been applied it must be dried and cured. Ultimately, complete removal of the water or water-based solvent is desired. Various manners of accomplishing water or water-based solvent removal include the use of a vacuum and/or flowing dry air over the coating. The present inventive coating is then cured at room temperature at preferably 30 to 70% humidity for from about 2 to about 4 hours.

The present invention is described in more detail with reference to the following Examples which are for purposes of illustration only and are not to be understood as indicating or implying any limitations on the broad invention described herein.

WORKING EXAMPLES

Components Used

In the Working Examples set forth below, the following components were used:

ANTIMICROBIAL AGENT: 99.0% pure powdered silver oxide (avg. particle size=3 microns), as ailable from Mallinckrodt Co., Paris, Ky., under the product designation Purified Silver Oxide Powder.

ADHESIVE AGENT: a mixture of 20.8% by weight silica, 8.3% by weight potassium oxide, balance water, available from Philadelphia Quartz Co., Philadelphia, Pa., under the product designation Kasilt® #1 (3.92 $SiO_2$:$K_2O$ molar ratio).

INSOLUBILIZER: 99% pure zinc oxide available from New Jersey Zinc Co., Ogdensbo, N.J., under the product designation Kadoxg) 911.

WATER: distilled water.

SILICA: a colloidal silica product available from Nyacol Products, Inc., Megunco Road, P.O. Box 349, Ashland, Mass. 01721, under the product designation NYACOL 2050.

INORGANIC COMPOUND: silica flour grade A-45 amorphous, available from Illinois Mineral Co., Cairo, Ill., under the product designation Silica Amorphous Grade 1160.

Sample Preparation

1. Coating Preparation.

Eight different coating formulations were prepared. In particular, the coating components identified above were mixed in the following proportions at 25° C. for 30 ± 5 seconds in a Waring® commercial blender (Model No. 31BL91) that was positioned on a Corning® stir hot plate (Model No. PC520).

| Components (% by wt.) | Coating Formulation | | | | | | | |
|---|---|---|---|---|---|---|---|---|
| | PA | V1 | V2 | V3 | V4 | V5 | V6 | V7 |
| ANTI-MICROBIAL AGENT | 1.1 | 1.3 | 1.1 | 3.1 | 1.0 | 2.8 | 3.3 | 1.1 |
| ADHESIVE AGENT | 27.7 | 28.3 | 26.7 | 26.2 | 33.8 | 33.2 | 27.6 | 27.4 |
| INSOLU-BILIZER | 6.0 | 14.1 | 18.7 | 18.3 | 16.9 | 16.6 | 13.8 | 13.7 |
| WATER | 49.7 | 56.5 | 53.5 | 52.4 | 48.3 | 47.4 | 55.3 | 54.8 |
| SILICA | — | — | — | — | — | — | — | 3.1 |
| INORGANIC COMPOUND | 15.5 | — | — | — | — | — | — | — |

Coating formulation "PA", as identified above, is the same formulation that is disclosed and claimed in U.S. Pat. No. 5,562,949 to Steele et al. Coating formulations "V1" through "V7" constitute the present inventive antimicrobial coating. For each formulation, the ADHESIVE AGENT was added to the WATER first, followed by the addition of the INSOLUBILIZER and in formulations "PA" and "V7", also by the INORGANIC. COMPOUND and SILICA, respectively. The ANTIMICROBIAL AGENT was added to the formulation after the addition of the INSOLUBILIZER and before mixing.

2. Test Sample Preparation.

Nine (9) test items manufactured from 347 stainless steel heat exchanger finstock samples and measuring 5.1 cm×5.1 cm×0.08 cm and eighteen (18) test panels also manufactured from 347 stainless steel panels and measuring 5.1 cm×5.1 cm×0.16 cm were weighed and then each set of two (2) samples coated with different coating formulations. The test samples were coated by dipping the samples for 30 ±5 seconds into the coating formulation and repeating the dipping procedure 3 times until a uniform coat resulted. The coating formulations were used to coat the test samples within 30 minutes of mixing. Excess coating was removed from each sample by dabbing the bottom of each test sample on a clean paper towel.

The test samples coated with coating formulations "V1" through "V7" were then dried or cured at room temperature at 30 to 70% humidity for two (2) hours. The test samples were then re-weighed and the coating weight determined by subtracting the weight of the coated sample from the weight of the sample prior to coating.

The test samples coated with coating formulation "PA" were packaged in a closed container and dried or cured at room temperature at 100% humidity for 16 hours. The samples were then placed in a convection oven and cured according to the following schedule:

0.5 hours±5 minutes at 82±5° C.;
1.0 hours±5 minutes at 93±5° C.;
0.5 hours±5 minutes at 104±5° C.;
0.5 hours±5 minutes at 121±5° C.;
1.0 hours±5 minutes at 149±5° C.; and then
2.0 hours±5 minutes at 260±5° C.

The test samples were then allowed to cool to 25 ° C. and weighed. The coating weights of the samples coated with formulation "PA" were then calculated as described above.

Two separate trials were conducted. The first trial involved test samples coated with coating formulations "V1" and "PA" while the second trial involved test samples coated with coating formulations "V2" through "V7" and "PA". For ease of reference, these trials are reported concurrently.

It is further noted that additional test panels coated with formulation "PA" were also prepared. These coated panels were not subjected to the high temperature cure schedule described above. Instead, these panels were cured at room temperature (i.e., 25° C.) for 16 hours at 30 to 70% humidity. A simple water soak test showed that the coating on these test panels exhibited a drastic dissolution rate.

Test Methods

ANTIMICROBIAL CHARACTER: one test sample from each set of coated finstock samples was packaged in a polyethylene cup and labeled as "fresh-no soak" while the other test samples from each set were subjected to a vigorous 3 day submerged/agitation cycle, in deionized water by submerging the samples in deionized water contained in glass beakers positioned on stir plates. Each beaker was provided with a stir bar that was activated by the stir plate and that served to effect constant agitation of the water surrounding each test sample during this 3 day period. The test samples were then subjected to Zone of Inhibition testing as per the Kirby Bauer Standard Assessment of Antimicrobial Effectiveness, with the challenge microorganisms being Pseudomonas cepacia and Pseudomonas aeruginosa. Results are reported in millimeters (mm).

DISSOLUTION PROPERTIES: Nine (9) sets of coated test panels were separately stored submerged in 140 ml. of deionized water in glass containers at room temperature. After designated time periods, all of the deionized water was removed from each container and tested for pH, conductivity and for ionic: silver, silicon, potassium and zinc, while each tared panel was dried with isopropyl alcohol and dry filtered nitrogen and then weighed for the purpose of determining % weight loss. Each tared panel was then placed in a fresh container and a new charge of 140 ml of fresh deionized water added thereto. Water was not agitated when the panels were submerged. The panels were stored submerged for additional designated time periods with the above-referenced procedure being repeated at the end of each period. Results are reported in $\mu$ohms (conductivity), ppm (chemical constituent concentrations) and % weight loss.

ADHESION CHECK (% Wt. Loss): Nine (9) sets of coated test panels were weighed prior to coating to ±0.0001 g (X). One test panel from each set was reweighed after coating and curing (Y). The other test panels from each set were separately stored submerged in 140 ml. of deionized water in glass containers at room temperature. After 8 days, the panels were removed from each container, dried with isopropyl alcohol and dry filtered nitrogen and then reweighed (Y). A length of 0.5 inch wide tape (Scotch Brand Magic Tape, 3M Catalog Number 102) was then applied to the entire length of each test panel using normal finger pressure. The tape remained on each panel for 60 seconds and was then removed by pulling one end at approximately a 90° angle to the panel. Each panel was then reweighed to±0.0001 g (Z). The present weight loss was calculated by the following formula: % weight loss= ((Y−Z)/(Y−X))×100. The previously submerged test panels were then returned to their separate containers, stored submerged for additional designated time periods with the above-referenced procedure being repeated at the end of each period.

Examples 1 to 7 and C1 to C2

In these examples, test items coated with the coating formulations designated below were tested for antimicrobial character in accordance with the above-referenced test method. The results are set forth in Table I hereinbelow.

TABLE I

| SUMMARY OF EXAMPLES 1 TO 7 AND C1 TO C2 | | | | | | | | | |
|---|---|---|---|---|---|---|---|---|---|
| Example | 1 | C1 | 2 | 3 | 4 | 5 | 6 | 7 | C2 |
| Coating Formulation | V1 | PA | V2 | V3 | V4 | V5 | V6 | V7 | PA |
| Zone of Inhibition (mm) | | | | | | | | | |
| no immersion | 3 | 3 | 3 | 4 | 5–8 | 5 | 5 | 3 | 3 |
| 3-day immersion | 3 | 3 | 4 | 4 | 4 | 3–5 | 4–7 | 3–4 | 3 |

Examples 1 to 7 and C1 to C2 generally demonstrate that the present inventive room temperature cure, antimicrobial coating displays comparable, if not improved, antimicrobial character in both the fresh and artificially weathered state, when compared to prior art high temperature cure, antimicrobial coatings. Of particular note are Examples 3 to 6 which exhibit significantly improved antimicrobial character.

Examples 8 to 29 and C3 to C9

In these examples, the dissolution properties of test panels coated with the designated coating formulations were evaluated. In particular, in Examples 8 to 14 and C3 and C4 dissolution properties were evaluated by determining the conductivity of the water used to store the individual panels in accordance with the above-referenced test method. The results are set forth in Table IIA hereinbelow.

TABLE IIA

| SUMMARY OF EXAMPLES 8 TO 14 AND C3 TO C4 | | | | | | | | | |
|---|---|---|---|---|---|---|---|---|---|
| Example | 8 | C3 | 9 | 10 | 11 | 12 | 13 | 14 | C4 |
| Coating Formulation | V1 | PA | V2 | V3 | V4 | Y5 | V6 | V7 | PA |
| Conductivity ($\mu$ohm) | | | | | | | | | |
| 0.3 days | 141.5 | 99.1 | 213.0 | 199.7 | 273.0 | 221.0 | 176.0 | 146.0 | 89.0 |
| 3 days | 15.5 | 8.5 | 28.0 | 31.4 | 32.5 | 37.4 | 32.0 | 21.4 | 10.5 |
| 4 days | 4.8 | 3.7 | 9.6 | 15.3 | 9.8 | 17.6 | 15.3 | 5.0 | 3.3 |
| 5 days | 2.9 | 2.6 | 5.4 | 13.7 | 6.1 | 15.7 | 15.2 | 3.2. | 2.3 |
| 6 days | 2.4 | 1.7 | 4.5 | 15.2 | 4.7 | 15.4 | 15.0 | 3.3 | 2.6 |
| 7 days | 1.7 | 1.5 | — | — | — | — | — | — | — |
| 10 days | 4.0 | 3.2 | — | — | — | — | — | — | — |
| 11 days | 2.3 | 2.1 | — | — | — | — | — | — | — |
| 12 days | 2.3 | 2.3 | — | — | — | — | — | — | — |
| 13 days | 3.3 | 4.4 | — | — | — | — | — | — | — |

Examples 15 to 21 and C5 to C6

In these examples, the % weight loss (as a function of days submerged in 140 ml. of deionized water) of the coated test panels used in the above-referenced conductivity testing was determined. The results are set forth in Table IIB hereinbelow.

TABLE IIB

SUMMARY OF EXAMPLES 15 TO 21 AND C5 TO C6

| Example | 15 | C5 | 9 | 17 | 18 | 19 | 20 | 21 | C6 |
|---|---|---|---|---|---|---|---|---|---|
| Coating Formulation | V1 | PA | V2 | V3 | V4 | Y5 | V6 | V7 | PA |
| % Weight Loss | | | | | | | | | |
| 0.3 days | 23.1 | 9.4 | 18.6 | 18.7 | 19.7 | 22.4 | 21.8 | 25.3 | 10.0 |
| 3 days | 13.9 | 3.5 | 11.1 | 12.2 | 12.5 | 15.0 | 15.8 | 19.7 | 3.2 |
| 4 days | 3.5 | 1.4 | 15.0 | 4.6 | 4.1 | 5.8 | 4.2 | 5.4 | 1.6 |
| 5 days | 3.1 | — | — | 3.5 | 5.1 | 4.5 | 4.0 | 3.3 | 0.6 |
| 6 days | 3.9 | 4.5 | 2.7 | 3.1 | 3.8 | 4.2 | 4.2 | 3.2 | 1.8 |
| 7 days | 0.9 | — | — | — | — | — | — | — | — |
| 10 days | 1.5 | 1.3 | — | — | — | — | — | — | — |
| 11 days | 1.5 | 1.5 | — | — | — | — | — | — | — |
| 12 days | 0.2 | 0.1 | — | — | — | — | — | — | — |

Examples 22 to 28 and C7 to C8

In these examples, the water used to submerge the test panels used in the above-referenced conductivity testing was tested for ionic silver. The results are listed in Table IIC.

TABLE IIC

SUMMARY OF EXAMPLES 22 TO 28 AND C7 TO C8

| Example | 22 | C7 | 23 | 24 | 25 | 26 | 27 | 28 | C8 |
|---|---|---|---|---|---|---|---|---|---|
| Coating Formulation | V1 | PA | V2 | V3 | V4 | Y5 | V6 | V7 | PA |
| Silver (Ag) Concentration (ppm) | | | | | | | | | |
| 0.3 days | 3.1 | 0.9 | 5.0 | 6.9 | 4.2 | 4.5 | 5.1 | 4.8 | 0.9 |
| 3 days | 4.5 | 1.5 | 13.2 | 0.1 | 1.6 | 8.4 | 0.6 | 0.7 | 0.5 |
| 4 days | 3.2 | 1.3 | 9.5 | 1.6 | 1.3 | 1.6 | 0.6 | 1.2 | 0.6 |
| 5 days | 0.9 | 0.3 | — | — | — | — | — | — | — |
| 6 days | 1.1 | 0.7 | — | — | — | — | — | — | — |
| 7 days | 0.4 | 0.3 | — | — | — | — | — | — | — |

Examples 29 and C9

In these examples, the water used to submerge the test panels used in the conductivity testing was tested for pH, ionic silicon, potassium, and zinc. The results are listed in Table IID.

TABLE IID

SUMMARY OF EXAMPLE 29 AND C9

| Example | 29 | C9 |
|---|---|---|
| Coating Formulation | V1 | PA |
| pH | | |
| 0.3 days | 9.47 | 9.44 |
| 3 days | 8.06 | 8.17 |
| 4 days | 6.81 | 6.95 |
| Silicon (S) Concentration (ppm) | | |
| 0.3 days | 8.6 | 5.9 |
| 3 days | 10.3 | 2.3 |
| 4 days | 2.7 | 1.0 |
| Potassium (K) Concentration (ppm) | | |
| 0.3 days | 26.0 | 28.0 |
| 3 days | 4.8 | 4.1 |
| 4 days | <0.1 | 1.4 |
| Zinc (Zn) Concentration (ppm) | | |
| 0.3 days | 1.0 | 0.3 |
| 3 days | 1.7 | 0.6 |
| 4 days | 0.9 | 0.5 |

Examples 8 to 29 generally show a greater degree of initial dissolution when compared to Comparative Examples C3 to C9. After 3 days, Examples 8 and C3, 15 and C5, 22 and C7 and 29 and C9 of the first trial, typically demonstrated a significant reduction in dissolution. After 7 days, comparable dissolution rates were obtained for Examples 8 and C3 and 15 and C5.

Examples 30 to 36 and C10 to C11

In these examples, coated test panels were tested for adhesion properties. The results are set forth in Table III hereinbelow.

TABLE III

SUMMARY OF EXAMPLES 30 TO 36 AND C10 TO C11

| Example | 30 | C10 | 31 | 32 | 33 | 34 | 35 | 36 | C8 |
|---|---|---|---|---|---|---|---|---|---|
| Coating Formulation | V1 | PA | V2 | V3 | V4 | V5 | V6 | V7 | PA |
| Adhesion (% Wt. Loss) | | | | | | | | | |
| pre-immersion | — | — | — | — | — | 0.33 | — | 1.04 | — |
| immersion | | | | | | | | | |
| 8 days | — | — | 0.49 | 1.17 | 5.17 | 4.88 | 1.28 | 1.34 | 2.74 |
| 11 days | 3.41 | 2.33 | — | — | — | — | — | — | — |
| 13 days | 4.36 | 2.54 | — | — | — | — | — | — | — |

Examples 31, 32, 35 and 36 demonstrate significantly improved adhesion characteristics when compared to Comparative Example C11. Examples 30, 33 and 34, although showing a greater % wt. loss, are still within acceptable limits.

Although the present invention has been shown and described with respect to detailed embodiments thereof, it will be understood by those skilled in the art that various changes in form and detail thereof may be made without departing from the spirit and scope of the claimed invention.

What is claimed is:

1. A room temperature cure, antimicrobial coating composition in slurry form, wherein said slurry comprises:
   a. from about 1.0% to about 3.6% by weight of an antimicrobial agent;
   b. from about 22.6% to about 33.8% by weight of an adhesive agent;
   c. from about 12.8% to about 18.7% by weight of an insolubilizer for insolubilizing said adhesive agent; and
   d. from about 47.4% to about 60.3% by weight of water or a water-based solvent,
   wherein the sum of components a through d is 100% by weight, based upon the total weight of said slurry, and
   wherein said coating is curable at room temperature at 30 to 70% humidity for from about 2 to about 4 hours.

2. A room temperature cure, antimicrobial coating composition in slurry form, wherein said slurry comprises:
   a. from about 3.0% to about 3.6% by weight of an antimicrobial agent;
   b. from about 22.6% to about 32.6% by weight of an adhesive agent;
   c. from about 12.8% to about 14.8% by weight of an insolubilizer for insolubilizing the adhesive agent; and
   d. from about 50.3% to about 60.3% by weight of water or a water-based solvent,
   wherein the sum of components a through d is 100% by weight, based upon the total weight of said slurry, and
   wherein said coating is curable at room temperature at 30 to 70% humidity for from about 2 to about 4 hours.

3. The room temperature cure, antimicrobial coating composition of claims 1 or 2, wherein said antimicrobial agent is a salt selected from the group consisting of arsenic salt, iodine salt, iron salt, mercury salt, silver salt, tin salt and mixtures thereof.

4. The room temperature cure, antimicrobial coating composition of claims 1 or 2, wherein said adhesive agent is selected from the group consisting of potassium silicate, boro-silicate glass and mixtures thereof.

5. The room temperature cure, antimicrobial coating composition of claims 1 or 2, wherein said insolubilizer is selected from the group consisting of zinc oxide and silicofluorides of sodium, potassium, barium, manganese and mixtures thereof.

6. A room temperature cure, antimicrobial coating composition, in slurry form, wherein said slurry composes:
   a. from about 3.0% to about 3.6% by weight of silver oxide;
   b. from about 22.6% to about 32.6% by weight of potassium silicate;
   c. from about 12.8% to about 14.8% by weight of zinc oxide; and
   d. from about 50.3% to about 60.3% by weight of water or a water-based solvent,
   wherein the sum of components a through d is 100% by weight, based upon the total weight of said slurry, and
   wherein said coating is curable at room temperature at 30 to 70% humidity for from about 2 to about 4 hours.

7. An air handling or water processing system or subsystem having chronically moist or wet surfaces, wherein said chronically moist or wet surfaces are coated with a room temperature cure, antimicrobial coating, wherein said coating, in slurry form, comprises:
   a. from about 1.0% to about 3.6% by weight of an antimicrobial agent;
   b. from about 22.6% to about 33.8% by weight of an adhesive agent;
   c. from about 12.8% to about 18.7% by weight of an insolubilizer for insolubilizing said adhesive agent; and
   d. from about 47.4% to about 60.3% by weight of water or a water-based solvent,
   wherein the sum of components a through d is 100% by weight, based upon the total weight of said slurry, and
   wherein said coating is curable at room temperature at 30 to 70% humidity for from about 2 to about 4 hours.

8. An air handling or water processing system or subsystem having chronically moist or wet surfaces, wherein said chronically moist or wet surfaces are coated with a room temperature cure, antimicrobial coating, wherein said coating, in slurry form, comprises:

a. from about 3.0% to about 3.6% by weight of an antimicrobial agent;

b. from about 22.6% to about 32.6% by weight of an adhesive agent;

c. from about 12.8% to about 14.8% by weight of an insolubilizer for insolubilizing the adhesive agent; and d. from about 50.3% to about 60.3% by weight of water or a water-based solvent, wherein the sum of components a through d is 100% by weight, based upon the total weight of said slurry, and wherein said coating is curable at room temperature at 30 to 70% humidity for from about 2 to about 4 hours.

9. The air handling or water processing system or subsystem of claims 7 or 8, wherein said antimicrobial agent is a salt selected from the group consisting of arsenic salt, iodine salt, iron salt, mercury salt, silver salt, tin salt and mixtures thereof.

10. The air handling or water processing system or subsystem of claims 7 or 8, wherein said adhesive agent is selected from the group consisting of potassium silicate, borosilicate glass and mixtures thereof.

11. The air handling or water processing system or subsystem of claims 7 or 8, wherein said insolubilizer is selected from the group consisting of zinc oxide and silicofluorides of sodium, potassium, barium, manganese and mixtures thereof.

12. An air conditioner cooling coil having chronically moist or wet surfaces, wherein said chronically moist or wet surfaces are coated with a room temperature cure, antimicrobial coating, wherein said coating, in slurry form, comprises:

a. from about 3.0% to about 3.6% by weight of silver oxide;

b. from about 22.6% to about 32.6% by weight of potassium silicate;

c. from about 12.8% to about 14.8% by weight of zinc oxide; and d. from about 50.3% to about 60.3% by weight of water or a water-based solvent, wherein the sum of components a through d is 100% by weight, based upon the total weight of said slurry, and wherein said coating is cured at room temperature at 30 to 70% humidity for from about 2 to about 4 hours.

* * * * *

UNITED STATES PATENT AND TRADEMARK OFFICE
CERTIFICATE OF CORRECTION

PATENT NO. : 6,170,564 B1
DATED : January 9, 2001
INVENTOR(S) : John W. Steele

It is certified that error appears in the above-identified patent and that said Letters Patent is hereby corrected as shown below:

Title page,
In the title [54], after "CURE" insert -- , --;
Line 4, delete "INCLUDES" and after "PROPERTIES" insert -- INCLUDING --.

Column 1,
Line 1, after "CURE" insert -- , --;
Line 4, delete "INCLUDES" and after "PROPERTIES" insert -- INCLUDING --;
Line 26, delete "calc ium" and after "silica" insert -- calcium --;
Line 36, delete "5000°F" and after "temperature of" insert -- 500°F --.

Column 2,
Line 48, delete "microbe", and after "the" insert -- microbes --;
Line 60, delete "therein)f" and after "mixtures" insert -- thereof --.

Column 4,
Line 25, delete "eight" and after "total" insert -- weight --;
Line 50, delete "d,void" and before "areas" insert -- devoid --.

Column 5,
Line 30, delete "Kadoxg)911" and after "designation" insert -- Kadox ® 911 --;
Lines 36-37, delete "I11." and insert -- IL --.

Column 8, Table IIA,
Line 44, delete "Y5" and after "V4" insert -- V5 --.

Column 9, Table IIB,
Line 4, delete "9" and after "C5" insert -- 16 --;
Line 7, delete "Y5" and after "V4" insert -- V5 --.

Column 9, Table IIC,
Line 31, delete"Y5" and after "V4" insert -- V5 --.

UNITED STATES PATENT AND TRADEMARK OFFICE
CERTIFICATE OF CORRECTION

PATENT NO. : 6,170,564 B1
DATED : January 9, 2001
INVENTOR(S) : John W. Steele

It is certified that error appears in the above-identified patent and that said Letters Patent is hereby corrected as shown below:

<u>Column 11, Table III,</u>
Line 10, delete "C8" and after "36" insert -- C11 --.

<u>Claims,</u>
<u>Claim 1, column 11,</u>
Lines 33-34, delete "composition in" and after "coating" insert -- composition, in --;
Lines 49-50, delete "composition in" and after "coating" insert -- composition, in --.

Signed and Sealed this

Thirtieth Day of October, 2001

Attest:

NICHOLAS P. GODICI
*Attesting Officer*  *Acting Director of the United States Patent and Trademark Office*